Figure 1:
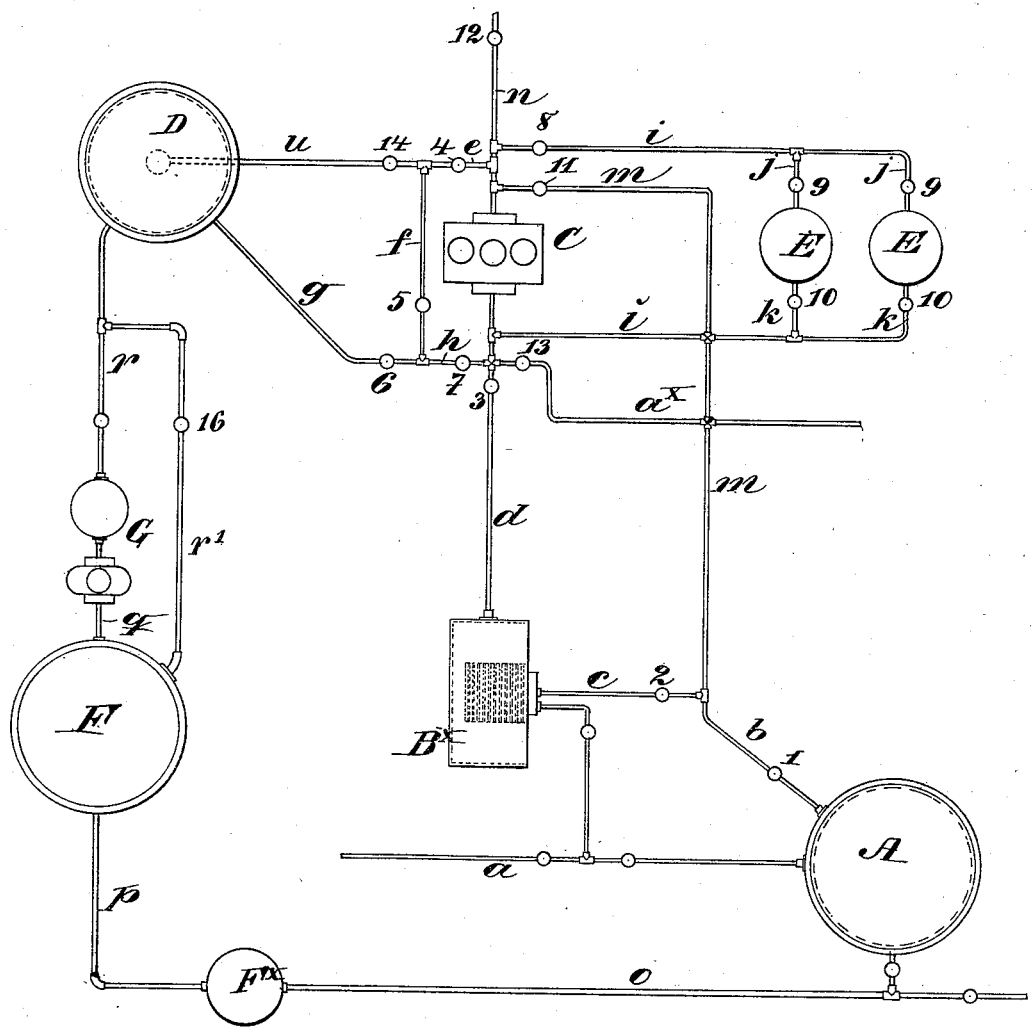

(No Model.) 2 Sheets—Sheet 1.

E. WALLER & B. C. HINMAN.
MANUFACTURE OF WHITE LEAD.

No. 509,059. Patented Nov. 21, 1893.

Witnesses:
Peter A. Ross.
F. W. Hinman

Inventors
Elwyn Waller
Bertrand C. Hinman
by Henry Connett
his Attorney (No Model.) 2 Sheets—Sheet 2.
E. WALLER & B. C. HINMAN.
MANUFACTURE OF WHITE LEAD.
No. 509,059. Patented Nov. 21, 1893.
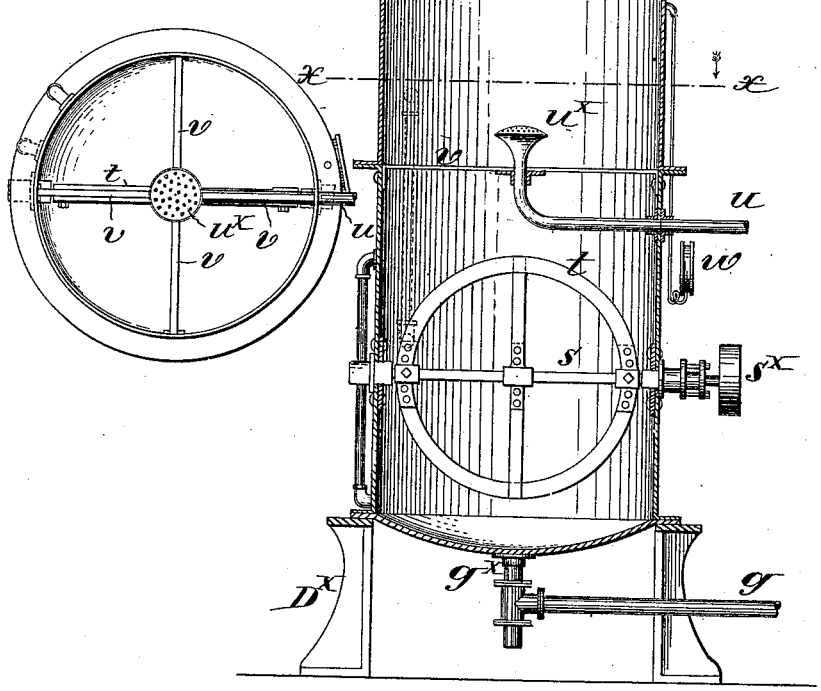

UNITED STATES PATENT OFFICE.

ELWYN WALLER, OF NEW YORK, AND BERTRAND C. HINMAN, OF BROOKLYN, NEW YORK.

MANUFACTURE OF WHITE LEAD.

SPECIFICATION forming part of Letters Patent No. 509,059, dated November 21, 1893.

Application filed June 7, 1893. Serial No. 476,833. (No specimens.)

*To all whom it may concern:*

Be it known that we, ELWYN WALLER, residing at New York, in the county of New York, and BERTRAND C. HINMAN, residing at Brooklyn, in the county of Kings, State of New York, citizens of the United States, have invented certain new and useful Improvements in the Manufacture of White Lead by Precipitation, of which the following is a specification.

This invention relates in part to a method of effecting the precipitation of white lead or lead hydrocarbonate from solutions of lead acetate, and in part to certain apparatus employed in such precipitation.

The invention will be fully described hereinafter, in connection with the accompanying drawings, and its novel features carefully described in the claims.

In the accompanying drawings—Figure 1 is a somewhat diagrammatic plan showing the several elements or parts of the apparatus and the pipe connections. Fig. 2 is a vertical, axial section of the precipitating vessel and its attachments, on a larger scale than Fig. 1. Fig. 3 is a horizontal section of this vessel taken in the plane indicated by line $x, x,$ in Fig. 2.

Referring to Fig. 1—A represents the digester, in which finely ground native lead carbonate, or the decarbonated ore, is digested, under the influence of heat, with a solution of neutral lead acetate, for the production of a basic lead acetate solution.

B is a filter for filtering the basic solution and also, where required, for filtering the water employed in the process. The liquid from the filter flows into a tank or basin $B^\times$.

C is a pump of any good kind, for circulating and forcing the water and solutions from one point to another as required.

D is the precipitating tank or vessel, which will be more minutely described hereinafter.

E, E, are settling tanks or vessels of which there may be any number required.

F is the gas holder, which receives the carbon dioxide gas eliminated from the native lead carbonate, and $F^\times$ is the condenser through which the gas passes on its way to the holder.

G is the gas compressor.

The several parts or elements of the apparatus are connected by pipes and these pipes are provided with cocks, all of which will be referred to more particularly hereinafter. The pipes are designated by small reference letters and the cocks by reference numerals.

At starting, a charge of lead-bearing powder, either native carbonate or de-carbonated ore, is placed in the digester A, together with a solution of neutral lead acetate, and water, if necessary, admitted by pipe $a$, from the main. The digester and its charge is then heated either by a furnace or steam coil. The basic solution thus produced in the digester, is then drawn off into the tank $B^\times$ through the filter B, by way of pipes $b$ and $c$, the cocks 1 and 2 being opened. While the charge of basic lead acetate is being prepared and filtered, a charge of carbonated water is prepared in the precipitating vessel D, under pressure, as will be described more minutely hereinafter. The filtered basic solution is now taken by the pump C from the tank $B^\times$ and forced into the charged precipitating tank by way of the pipes $d, e, f$ and $g$, the cocks 3, 4, 5 and 6 being opened. The pipe $g$ leads to the bottom of the precipitating vessel D, and is adapted to be connected with either the receiving or discharge side of the pump C; with the latter by means of the cross-pipe $f$, and the cock 5, therein. After the precipitation has been effected in the vessel D, the liquid contents of this vessel are withdrawn by the pump C and forced to the settling tanks E by way of the pipes $g, h, i$ and $j$, the cocks 6, 7, 8 and 9 being opened. After the white lead has settled in the tanks E, the solution of neutral lead acetate is withdrawn from these tanks and forced into the digester A, by way of the pipes $k, l, m$ and $b$, the cocks 10, 11 and 1 being opened.

To wash the precipitated lead in the settling tanks, water is run into the tanks from the main, or pumped in, and this water is afterward pumped into the digester. Or, it may be pumped from the settling tanks into the sewer by way of the pipes $k, l$ and $n$, the cocks 10 and 12 being open. The carbon dioxide gas eliminated from the charge, either in the digester or the de-carbonator, flows by way of the pipe $o$, to the condenser $F^\times$ (where a condenser or cooler is employed), and thence by pipe $p$ to the gas-holder F. The compressor G takes the gas from the holder by pipe $q$, and from the compressor it passes to the precipitating tank by way of the pipe $r$.

The construction of the precipitating apparatus will now be described with especial reference to Figs. 2 and 3. The vessel or tank D is by preference cylindrical with convex heads, and stands upright on a base or bed $D^\times$. The pipe $g$ is connected with the tank-bottom at $g^\times$. In the lower part of the tank is mounted, on a horizontal shaft, $s$, a ring-like, rotating agitator, $t$, which is driven from a pulley, $s^\times$, on the shaft and outside of the tank. The shaft rotates in a packed bearing in the shell or wall of the tank. A pipe, $u$, from the delivery side of the pump C, enters the tank at a point above the level of the agitator $t$, and at its inner, upturned end, it is provided with a perforated or "rose" nozzle, $u^\times$. This nozzle is supported by a transverse bar $v$. The pipe $r$ from the gas compressor G, enters the tank D at or near its top and on either side as may be found most convenient.

The mode of precipitating is as follows:—Water is introduced into the tank D with the pump C, by way of the pipes $a^\times$, $f$ and $g$ (Fig. 1), the cocks 13, 4, 5 and 6 being open. The gas is then forced into the tank D from the compressor until the gage, $w$, shows the proper pressure, preferably about fifty pounds. The water in the tank is now circulated by the pump C, being taken out by way of the pipe $g$ and forced in through the pipe, $u$, the cocks 6, 7, 4 and 14 being open. This circulation has the effect to throw the water upward in a spray from the nozzle $u^\times$, and cause it to dissolve or take up the gas, which will be observed by the lowering of the pressure on the gage. More gas may be forced in to maintain a pressure of about fifty pounds. After saturation of the water with the gas, the pressure is lowered in the tank to about ten pounds by opening a cock 16, in a by-pipe $r'$, which allows the gas to flow back to the generator F. The basic solution from the digester is then forced into the tank D by the pump C, and the agitator $t$ set in motion. This will intimately mix the carbonated water with the basic solution, under pressure, and cause the precipitation of lead in the form of lead hydrocarbonate. After the precipitation has been effected in the tank D, the charge will be pumped from said tank into the settling tanks E, as before described, or be removed from the precipitating tank for the purpose of separating white lead from the solution of neutral acetate, whatever means may be employed for effecting this separation.

Having thus described our invention, we claim—

1. The herein described method of effecting the precipitation of white lead from a solution of the basic acetate, which consists in first forming a strong solution of carbon dioxide and water, under pressure, in a closed receptacle by circulation and spraying of the water in the presence of the gas, then forcing into said solution a solution of basic lead acetate and thoroughly agitating the mixed solutions, and then, while the white lead is still in suspension in the liquid, removing the latter from the tank wherein the precipitation was effected, substantially as set forth.

2. The combination to form a precipitating apparatus in the manufacture of white lead, of a closed tank D, a rotating agitator mounted therein, a pump, a pipe $g$ connecting the receiving side of the pump with the lower part of the tank D, a pipe $u$, connecting the discharge of said pump with the tank D, a perforated nozzle, $u^\times$, on the end of the pipe $u$, within the tank and above the agitator, a gas compressor, a pipe $r$, connecting said compressor with the upper part of the tank D, a receptacle for lead acetate solution connected with the receiving side of said pump, and controlling cocks whereby the said solution may be forced into the tank D, substantially as set forth.

3. The combination to form a precipitating and separating apparatus in the manufacture of white lead, of a closed precipitating tank, an agitator therein, a gas compressor connected with the upper part of the precipitating tank, a settling tank, a pump, and pipes with controlling cocks connecting the precipitating and settling tanks, substantially as set forth.

In witness whereof we have hereunto signed our names in the presence of two subscribing witnesses.

ELWYN WALLER.
BERTRAND C. HINMAN.

Witnesses:
  PETER A. ROSS,
  JAMES K. DUFFY.